United States Patent

Ferm

[15] 3,650,113
[45] Mar. 21, 1972

[54] PROCESS FOR REDUCING WATER PERMEABILITY OF POROUS SOILS

[72] Inventor: Richard L. Ferm, Lafayette, Calif.

[73] Assignee: Chevron Research Company, San Francisco, Calif.

[22] Filed: Sept. 23, 1970

[21] Appl. No.: 74,852

[52] U.S. Cl. ................................................................. 61/36
[51] Int. Cl. .......................................................... E02d 3/12
[58] Field of Search ................................. 61/36, 1; 106/277

[56] References Cited

UNITED STATES PATENTS

| | | | |
|---|---|---|---|
| 3,108,441 | 10/1963 | Watson | 61/36 R |
| 3,236,671 | 2/1966 | Dybalski et al. | 61/36 R X |
| 3,298,982 | 1/1967 | Glenn et al. | 61/36 R X |
| 3,359,738 | 12/1967 | Dybalski et al. | 61/36 R X |

*Primary Examiner*—David J. Williamowsky
*Assistant Examiner*—Philip C. Kannan
*Attorney*—A. L. Snow, F. E. Johnston, G. F. Magdeburger and B. I. Rowland

[57] ABSTRACT

A method of treating porous soils to increase their water-holding capacity comprising applying an asphalt-in-water type emulsion having a median asphalt particle size of from about 0.4 to 1.0 microns to the surface of the soil to be treated. Preferably, the soil is prewet and the submicronic emulsion is applied in a dilute form having from about 1 to about 20 percent solid residue.

11 Claims, No Drawings

PROCESS FOR REDUCING WATER PERMEABILITY OF POROUS SOILS

BACKGROUND OF THE INVENTION

Field of the Invention and Description of the Prior Art

In many areas of the world, farms are located on sandy soil. These soils often exist in areas where rainfall is minimal and water is at a premium. Irrigation of these types of soil is often unsuccessful, or at best, expensive, because coarseness of the sands results in high porosity of the soil and consequent loss of the water through high drainage rates.

Further, irrigation ditches used to transport water to the fields are themselves highly porous since they are constructed in the same type soil that is being irrigated.

A system for treating (1) highly porous soil, (2) irrigation channels constructed in this type of soil, (3) holding ponds, and (4) the like to decrease the porosity would be highly desirable since the quantity of water that the soil could then hold would reduce irrigation requirements and could make porous sandy soils profitable for agriculture. Certain criteria must be met by any system chosen. The material used must be non-toxic to humans, animals, and crops, and soil temperatures such as freezing or thawing must not affect the material. Preferably, the material used to treat the soil should be at a sufficient depth in the soil to resist damage by farm equipment or animals.

A key to any solution is the economics of treating the soil, irrigation channels, etc. Attempts have been made in the past to solve this problem. One of these methods is described in *I&EC Product Research and Development*, Vol. 8, No. 3, Sept. 1969 in an article entitled "Use of Asphalt to Increase Water-Holding Capacity of Droughty Sand Soils." Field experiments described in that article and in corresponding Canadian Pat. No. 837,216 show that the productivity of sand soil can be markedly increased and less irrigation water is required when a layer of asphalt is placed below the plant root zone in sandy soils. On a particular project the quantity of water that the soil could hold was doubled by this method of treatment of the soil.

This method of treatment, however, has disadvantages. The upper 2 feet of the soil must be raised about 5 inches by a sweep. Nozzles mounted under the sweep spray asphalt emulsion in an ammonia atmosphere on the sides and bottoms of the cavity formed by the sweep. The inefficiency and laborious nature of such a treatment is self-evident.

A more satisfactory method of treating a porous-type soil in similar structures would be to apply an emulsion to the surface of the soil which would penetrate and form an impermeable membrane at some point below the soil, sufficiently deep that interference with the planting of crops would not occur. Such a treatment would obviously be much less expensive than a process involving physical displacement of the soil such as was described above. Such a process has been described in U.S. Pat. No. 3,108,441. In this reference porous soils making up the bed of irrigation canals and the like are treated by adding a concentrated aqueous dispersion of wax to the water in the canal. The diluted wax emulsion penetrates the soil and forms a sub-surface membrane which acts as a sealant. The reference also teaches that in porous soils with very high seepage rates the soil can be first treated with an asphalt emulsion to reduce the size of the voids between the soil particles thereby rendering more effective the subsequent wax emulsion treatment. This method of treatment while effective does not have as great a durability as is desirable and for the more porous soils a two-step process is required. U.S. Pat. No. 3,236,671 teaches a method for reducing seepage losses from contained bodies of water by use of bituminous emulsions which in highly porous soils can penetrate up to 8 inches thereby reducing the permeability of the soil.

U.S. Pat. No. 3,227,572 teaches a similar process for repairing cracked pipes by introducing a wax emulsion into the water filled pipe which then escapes through the crack into the surrounding soil and seals off the leak.

SUMMARY OF THE INVENTION

A method of treating porous soils to increase their water-holding capacity comprising applying an anionic asphalt-in-water type emulsion having a median asphalt particle size of from about 0.4 to 1.0 microns to the surface of the soil to be treated. Preferably, the soil is prewet and the submicronic emulsion is applied in a dilute form having from about 1 to about 20 percent solid residue. At least a portion of the sub-surface membrane seals are formed at depths of at least about 10 inches below the surface and some may be as deep as 48 inches or more.

DETAILED DESCRIPTION OF THE INVENTION

Submicronic emulsions having a median asphalt particle size of from about 0.4 to 1.0 microns utilized in the subject invention may most efficiently be applied to porous soils by delivering the concentrated emulsion as manufactured to the site of application and diluting the emulsion on site. The level of dilution is preferably in a range to give a solids residue of from about 1 to about 20 percent by weight as applied, preferably from about 2 to about 6 percent. The only criterion is that the pounds of residue per sq. ft. of treated soil be in the range of from about 0.1 to about 3 pounds, preferably in the range of from 0.5 to 1.5 pounds per sq. ft., and most preferably about 1 pound per sq. ft.

Two primary methods of treatment are preferred with the selection of either being dependent on the nature of the soil and type of project, i.e., an irrigation ditch, holding pond, or farm land. When a field is being treated, the type of crop being grown thereon may also be important. For example, if a field is being treated in which a crop normally growing in rows will be planted, the treatment may be limited to the furrows between the rows in which irrigation water would normally flow. When utilizing the furrow method, irrigation water is allowed to flow along the furrows utilizing the standard procedure. The emulsion is then metered into the water at a rate to give the desired treatment level of from 0.1 to 3 pounds per sq. ft. of treated soil. The flow rate of the irrigation water is controlled to provide a treatment stream with the desired solids residue level. The treatment levels previously described are for the actual treatment area, i.e., in a field in which furrow method is utilized, actual area of treatment may be only one-half the total square footage of the field.

Alternatively, when a large area is to be treated in its entirety, the area to be treated may be flooded with water and the submicronic emulsion added to the water at a metered rate as it enters the pond after an initial flooding. This method may be successfully utilized in irrigation ditches, holding ponds, and in fields where rice, wheat, and the like are to be grown, i.e., where the seeds are scattered and rows are not utilized, the same treatment level as previously described is required. However, the total amount of submicronic emulsion is increased since all the soil is treated in any given field utilizing the ponding method.

The membranes formed are discrete, upon excavation are visible to the naked eye, and range in thickness from about 0.5 millimeters up to about 7 millimeters. While thicknesses greater than 7 millimeters may be utilized, the use of membranes thicker than 7 millimeters is undesirable since any added strength is more than offset by the large quantities of emulsion required. At least a portion of the membranes formed are at a depth of at least about 10 inches and preferably 12 inches. By having a portion of the membranes at depths of 10, 12, or even 24 inches or more, damage to the membranes is minimized and the water holding capability of the soil is increased.

The emulsions utilized in this invention are characterized by the small particle sizes of the emulsified asphalt. Median particle sizes above 1.0 microns are unsatisfactory. While cationic, anionic, or non-ionic emulsions are satisfactory, anionic emulsions are preferred. Typical of those which are satisfactory are anionic emulsions comprised of from 40 to 70, preferably 50 to 65, percent by weight of an asphalt having a total acid number after augmentation with tall oil pitch of about 2.5 to about 6 milligrams KOH per gram of asphalt, 0.4 to 0.7 percent by weight caustic, and the balance water. Such emulsions are described in the copending application filed on the same date as this application in the names of Richard L. Ferm and Garth D. Schmidt and entitled "Submicronic Asphalt Emulsions."

A specific example of an asphalt emulsion useful in this invention is one comprised of 65 percent by weight of an 85/100 penetration grade paving asphalt having a total acid number prior to augmentation of 1.3, and after augmentation of 2.5; 0.4 percent sodium hydroxide, and the balance water. The acid number augmenter is tall oil pitch blended into the asphalt and constituting 2.3 percent by weight of the asphalt.

The following example teaches the preparation of a submicronic particle emulsion.

EXAMPLE 1

An aqueous solution was prepared consisting of 0.5 weight percent Vinsol resin, 0.5 weight percent Igepal CO-990 and 0.5 weight percent solid sodium hydroxide. An asphalt mixture containing 2 percent tall oil pitch was prepared by heating an SA 85/100 asphalt and incorporating therein 2 percent Emtall 906 (a tall oil pitch, product of Emery Industries Inc.).

The emulsion was then prepared by use of a colloid mill operating at 3,000 r.p.m. and a spacing of 25/1000 of an inch. The aqueous phase was introduced to the colloid mill at a temperature of 122° F. and a pH of 10.3. The asphalt mixture was introduced into the mill at a temperature of 280° F. Coming off the mill at a temperature of 210° F., the emulsion was pumped through a heat exchanger which reduced its temperature to 180° F. After reaching equilibrium, the temperature of the emulsion coming off the mill was 218° F. and after having been pumped through the exchanger was 205° F. The emulsion was then pumped through a holding tank which was maintained at 190° F. The emulsion had a residue of 65 percent by weight and a median particle size of less than 0.8 microns.

A total of 35 gallons of the emulsion was prepared with a residue of 65 percent, i.e., the asphalt and aqueous phase were combined in such a ratio as to give a 65 percent residue upon evaporation of the liquid portion of the emulsion.

EXAMPLE 2

An 8 × 8 foot test area was prepared in porous soil by constructing a polyethylene barrier around the sides of the test area to a depth of about 31 inches. To prevent lateral movement of water through the soil and to simulate a large field where lateral movement effects are substantially zero, a wooden barricade was built around the sides of the test area to enable water to a depth of 4 inches to be held in position over the test area plot.

Seepage rates on the 8 × 8 foot test area were obtained by pouring water over the surface of the plot inside the wooden barricade to a given depth and then determining the time necessary for all water to seep into the soil. Before treatment with the emulsion of Example 1, the seepage rate was determined to be 13.3 cu. ft. of water per sq. ft. of surface area per day. After determination of the natural seepage rate, the test area was filled with water to a depth of 4 inches with tap water. To this water layer was added sufficient emulsion solution of the formula set forth in Example 1 to obtain about 3.4 weight percent solution, i.e., 9 gallons or 77.5 pounds of the emulsion were placed in 263 gallons of water.

Five days later there still remained an inch of emulsion solution and water in the test site area.

Eleven days later there still remained about 1 inch of emulsion and water in the test site area.

After 16 days, when all water had evaporated and the top soil was relatively dry, the test site area was excavated to a depth of approximately 4 feet which revealed several membranes at varying depths of 21 inches, 15 inches, 11 inches, 6 inches and 3 inches. The membranes were thin but finite and readily observable to the eye.

The following example teaches the need for fine particle emulsions having median particle sizes less than 1.0 microns.

EXAMPLE 3 a. An asphalt emulsion was prepared comprised of 65 percent by weight of a 50/60 penetration grade bitumuls asphalt, 2 percent by weight of oleic acid, 2 percent by weight of Tween 40 (polyoxyethylene sorbitan monopalmitate, product of Atlas Chemical Industries), 0.27 percent by weight trienthanolamine, 0.23 percent by weight of Gantrez AN-169 (a maleic anhydride vinyl ether) product of General Aniline and Film Company) used as a thickener and about 0.14 percent by weight of potassium hydroxide. The emulsion was prepared on a Charlotte colloid mill with minimum spacing.

The emulsion had an asphalt particle size primarily ranging from 0.5 to 1.5 microns.

b. The emulsion of (a) above was tested for its soil sealant capabilities in an agricultural-type irrigation ditch having an initial seepage rate of about 29 cu. ft. of water per day. The banks of the ditch consisted of fine soil having a low seepage rate, and the bottom was composed primarily of clean coarse sand. To minimize disturbance of the silty banks, the banks of the ditch were lined with polyethylene film at the point the water was introduced into the ditch.

The ditch was slowly filled to its maximum capacity with irrigation water. The asphalt emulsion of (a) above was added to the water at several points along the ditch after it had been diluted to twice its volume with water to aid handling and dispersion.

As the water level dropped, the banks of the ditch were found to be very clean.

After the water level had dropped about half way, the ditch was refilled with water which was then allowed to drain out. Some immediate reduction in the seepage rate was noted at this time.

Two days later the ditch was inspected — all water had seeped out. Considerable surface sealing was noticed in the ditch.

The ditch was again filled to maximum capacity and its seepage rate determined. The rate had dropped to 8 cu. ft. per day indicating an overall seepage reduction of 72 percent.

Six days after the emulsion was placed in the ditch, the dry ditch was excavated to determine the nature of the seals. Only surface and very shallow seals were found in the silty end of the ditch where the water was introduced. In the opposite end of the ditch, multiple membrane seals 1 to 8 inches deep were found on the bottom of the ditch. Examination of the banks revealed that little of the asphalt had penetrated the silty soil.

This example indicates the need for median asphalt particle sizes less than 1 micron. Although seepage rates were reduced, substantial surface membranes were formed and substantially no penetration of the silty soil banks was obtained. Further, the subsurface membranes were only 1 to 8 inches below the surface leaving them vulnerable to damage by farm equipment or animals.

It is apparent that many widely different embodiments of this invention may be made without departing from the scope and spirit thereof; and, therefore, it is not intended to be limited except as indicated in the appended claims.

I claim:

1. A process for reducing water permeability of porous soil comprising applying to the surface of said porous soil a diluted asphalt-in-water emulsion having a median particle size of from about 0.4 to 1.0 microns, said asphalt-in-water emulsion having from about 1 to about 20 percent by weight solids residue at the applied treatment level, maintaining the dilute dispersion of said asphalt-in-water emulsion in contact with the surface of said soil for sufficient time to permit penetration of said emulsion into said porous soil to deposit subsurface asphaltic membranes essentially parallel with the soil surface, at least a portion of said membranes being at a depth of at least about 10 inches beneath said soil surface, and with the provisos that (1) said membranes are at least about one-half millimeter thick and (2) the pounds of residue from said asphalt-in-water emulsion is in the range of from about 0.1 to 3 pounds per sq. ft. of treated soil.

2. Claim 1 wherein said pounds of residue is in the range of from 0.5 to 1.5 pounds per sq. ft. of treated soil.

3. Claim 2 wherein said asphalt-in-water emulsion has from about 2 to about 6 percent by weight solids residue at the applied treatment level.

4. Claim 3 wherein at least a portion of said membranes are at a depth of at least about 12 inches.

5. Claim 1 wherein said asphalt-in-water emulsion is anionic in nature.

6. Claim 5 wherein said pounds of residue is in the range of from 0.5 to 1.5 pounds per sq. ft. of treated soil.

7. Claim 6 wherein said asphalt-in-water emulsion has from about 2 to about 6 percent by weight solids residue at the applied treatment level.

8. Claim 7 wherein at least a portion of said membranes are at a depth of at least about 12 inches.

9. Claim 8 wherein said pounds of residue is about 1 pound per sq. ft. of treated soil.

10. Claim 9 wherein said asphalt-in-water emulsion prior to dilution is comprised of 65 percent by weight of an 85/100 penetration grade paving asphalt having a total acid number prior to augmentation of about 1.3 and a total acid number after augmentation with an acid number augmenter of 2.5; 0.4 percent sodium hydroxide; and 34.6 percent water, said acid number augmenter being tall oil pitch present as 2.3 percent by weight of said asphalt.

11. Claim 1 wherein said asphalt-in-water emulsion, prior to dilution, is comprised of from 40 to 70 percent by weight of an asphalt having a total acid number after augmentation with tall oil pitch of from about 2.5 to about 6.

* * * * *